United States Patent
Astley et al.

(10) Patent No.: US 9,342,363 B2
(45) Date of Patent: May 17, 2016

(54) DISTRIBUTED ONLINE OPTIMIZATION FOR LATENCY ASSIGNMENT AND SLICING

(75) Inventors: Mark C. Astley, Wayne, NJ (US); Sumeer Bhola, Hastings on Hudson, NY (US); Cristian Lumezanu, Lanham, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1693 days.

(21) Appl. No.: 11/970,906

(22) Filed: Jan. 8, 2008

(65) Prior Publication Data

US 2009/0178047 A1    Jul. 9, 2009

(51) Int. Cl.
*G06F 9/46* (2006.01)
*G06F 9/50* (2006.01)

(52) U.S. Cl.
CPC ................................. *G06F 9/5038* (2013.01)

(58) Field of Classification Search
CPC .................................................. G06F 9/4887
See application file for complete search history.

(56) References Cited

U.S. PATENT DOCUMENTS 6,965,943 B1 * 11/2005 Golestani ................ H04L 47/10
370/232
2006/0106656 A1 * 5/2006 Ouimet ................... G06Q 10/06
705/7.39

OTHER PUBLICATIONS

Virtual Deadline Assignment in Distributed Real-time Database Systems Hung et al IEEE 1995.*
Using Cooperative Movile Agents to Monitor Distributed and Dynamic Environments, 2007, Ilarri et al.*
Eker et al., A Feedback Scheduler for Real-time Controller Tasks, Dec. 2000.*
Di Natale et al., Dynamic End-to-End Guarantees in Distributed Real Time Systems; RTSS; 1994 12 pages.
Lu et al., End-to-End Utilization Control in Distributed Real-Time Systems; ICDCS; 2004; 10 pages.
Jonsson et al., Deadline Assignment in Distributed Hard Real-Time Systems with Relaxed Locality Constraints; ICDCS; 1997; 7 pages.
Jonsson; A Robust Adaptive Metric for Deadline Assignment in Heterogeneous Distributed Real-Time Systems; IPPS/SPDP; 1999; 10 pages.
Wang et al., Decentralized Utilization Control in Distributed Real-Time Systems; RTSS; 2005; 10 pages.

* cited by examiner

*Primary Examiner* — Mengyao Zhe
(74) *Attorney, Agent, or Firm* — Tutunjian & Bietto, P.C.; Mecedes Hobson

(57) ABSTRACT

A system and method for latency assignment in a system having shared resources for performing jobs including computing a new resource price at each resource and sending the new resource price to a task controller in a task path that has at least one job running in the task path. A path price is computed for each task path of the task controller, if there is a critical time specified for the task. New deadlines are determined for the resources in a task path based on the resource price and the path price. The new deadlines are sent to the resources where the at least one job is running to improve system performance.

15 Claims, 9 Drawing Sheets

TASK 1

TASK 2

TASK 3

| Subtask | $T_{11}$ | $T_{12}$ | $T_{13}$ | $T_{14}$ | $T_{15}$ | $T_{16}$ | $T_{17}$ | $T_{21}$ | $T_{22}$ | $T_{23}$ | $T_{24}$ | $T_{25}$ | $T_{26}$ | $T_{27}$ | $T_{28}$ | $T_{31}$ | $T_{32}$ | $T_{33}$ | $T_{34}$ | $T_{35}$ | $T_{36}$ |
|---|---|---|---|---|---|---|---|---|---|---|---|---|---|---|---|---|---|---|---|---|---|
| ExecTime | 2 | 3 | 4 | 5 | 4 | 3 | 2 | 2 | 4 | 3 | 6 | 7 | 5 | 3 | 2 | 3 | 2 | 2 | 3 | 4 | 4 |
| Resource | 0 | 1 | 2 | 3 | 4 | 5 | 6 | 0 | 1 | 2 | 4 | 5 | 6 | 3 | 7 | 0 | 1 | 2 | 4 | 6 | 7 |

TABLE 1
SUBTASK PARAMETERS

FIG. 9

DISTRIBUTED ONLINE OPTIMIZATION FOR LATENCY ASSIGNMENT AND SLICING

BACKGROUND

1. Technical Field

The present invention relates to scheduling systems and methods, and more particularly to systems and methods for optimal resource allocation and latency prediction in distributed systems.

2. Description of the Related Art

The scope of soft real-time distributed systems is expanding into the enterprise world, as businesses aim to respond more rapidly to real-world events, including those generated due to sensors (e.g., RFID receivers). In addition, due to technology convergence, soft real-time applications like VOIP (voice over Internet protocol) and more general multimedia interactions, share the same infrastructure as non-real-time applications. These applications have real-time requirements on both session establishment and the resulting media streams.

The shared infrastructure for applications with a diverse set of real-time requirements (including the extreme case of no real-time requirements) is challenging in terms of ensuring that the requirements are met. Workloads of these applications can vary significantly over time, and available resources (both server and network resources) can change (due to failures or other reasons). Hence, a static schedule is not suitable.

There is also a trend towards the use of service level agreements (SLAs) to both quantify the importance of different applications and to flexibly state the quality of service requirements. For example, an SLA for an application could be used to derive a utility function that: (1) expresses the utility of the application as a function of latency; (2) implicitly encodes the importance with respect to other applications (maximum or minimum utility of this application versus that of another application); and, (3) explicitly encodes the importance of meeting a particular latency requirement (the decrease in utility if that latency is not achieved).

Since real-time applications are increasingly deployed on distributed systems, due to the diverse set of real-time requirements, varying workloads and changing resource demands, the scheduling of such applications may be challenging in terms of ensuring that the requirements are met.

SUMMARY

In accordance with the present principles, the problem of optimal resource allocation and latency prediction in distributed real-time systems is addressed where both network and computer processing unit (CPU) resources are consumed. Timeliness constraints of an application are expressed through, e.g., a utility function, which maps the end-to-end latency to a benefit value. A Lagrangian Latency Assignment (LLA), which is a scalable and efficient distributed methodology to maximize the aggregate utility over all applications, is presented. The methodology uses a feedback based mechanism to coordinate the resource consumption of different applications and predict their latency, runs continuously and adapts to both workload and resource variations. LLA is guaranteed to converge if the workload and resource requirements stop changing. We evaluate the quality of results and convergence characteristics under various workloads, using both simulation and real-world experimentation.

A system and method for latency assignment in a system having shared resources for performing jobs includes computing a new resource price at each resource and sending the new resource price to a task controller that has at least one job running at the resource. A path price may be computed for each task path of the task controller. New deadlines are determined for the jobs in a task path based on the resource price (and the path price). The new deadlines are sent to the resources where the task has at least one job running to improve system performance.

Another method for latency assignment in a system having shared resources for performing jobs includes computing a new resource price at each resource based upon latencies in a previous iteration, sending the new resource price to a task controller that has at least one subtask running at the resource as feedback, computing a path price for each path of the task at the task controller based upon latencies in the previous iteration, determining new deadlines for the subtasks in a task based on the resource prices and the path prices by maximizing a Lagrangian of a constrained objective function describing subtask latencies, sending the new deadlines to the resources where at least one subtask is running, and iterating to update deadlines.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 9 is a table showing subtask parameters associated with the subtasks of FIG. 8;

DETAILED DESCRIPTION OF PREFERRED EMBODIMENTS

Figure 1:
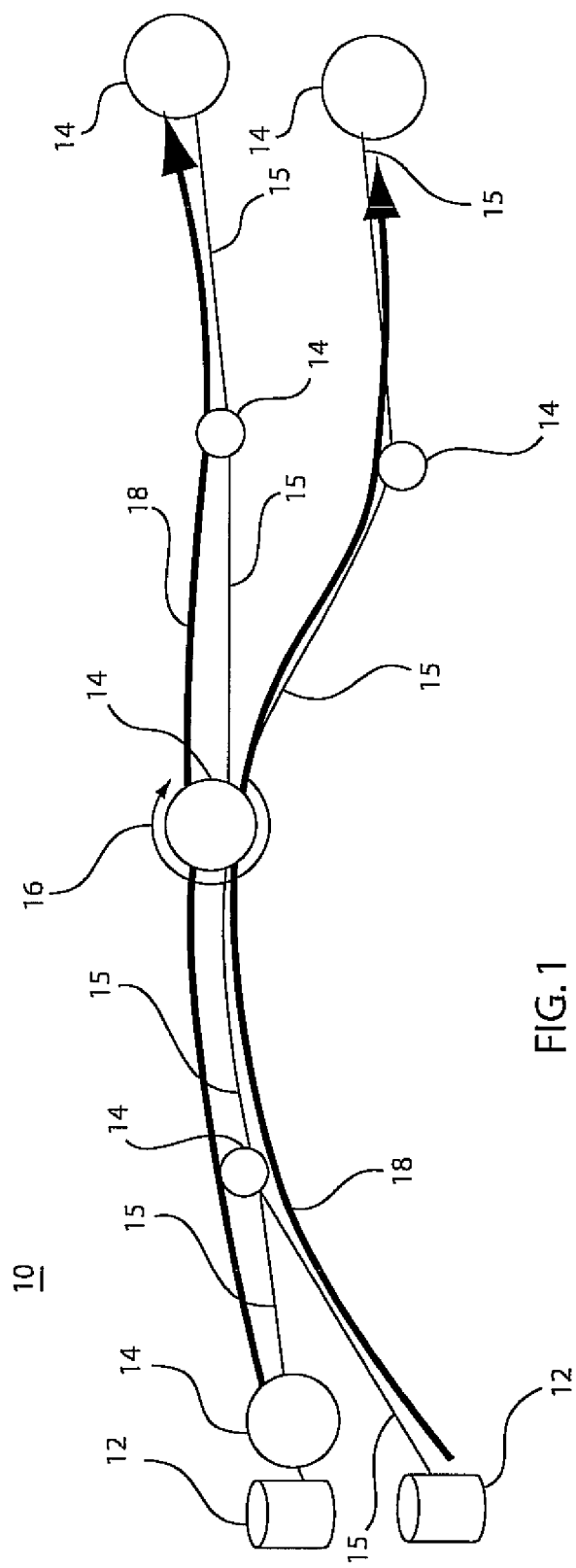
FIG. 1 is a diagram illustratively showing a system model in accordance with the present principles.

In accordance with useful embodiments, Lagrangian Latency Assignment (LLA) methodology is employed. LLA, as provided herein in accordance with the present principles, is an optimization, feedback-based methodology to control the scheduling parameters for soft real-time applications in a distributed system, such that the aggregate system utility is maximized. Such systems may include sensor networks, voice over Internet protocol systems, service networks, and any other distributed network, and distributed or shared resource network.

Prior work on feedback control approaches for scheduling sets of distributed applications is typically limited to adjusting aggregate CPU utilization on servers to ensure that all the distributed applications are schedulable. Therefore, the prior work does not take into account (1) a flexible application deadline, expressed as a utility function of latency, (2) different levels of importance for applications, and (3) network bandwidth resources.

The present approach incorporates limits on both CPU and network bandwidth, and in general can accommodate any similar resource constraints. One embodiment specifies the utility of the system as a non-increasing function of the latency of each application, which also expresses the application importance. Furthermore, the approach permits the use of different percentiles of individual latencies when computing the utility function.

For example, one application may use a $99^{th}$ percentile of all its individual latencies, while another may use a $50^{th}$ percentile, depending on the nature of the application or its SLA. The optimization problem may be solved online, offline, in a centralized manner or in a distributed manner, using, e.g., the price of resources to coordinate the resource consumption by different applications. As the optimization is constantly running, the system is adaptive, and adjusts to both workload and resource variations. The methodology is guaranteed to converge if the workload and resources stop changing.

One present optimization approach is model-based, e.g., for each application and resource used by that application, we predict the latency as a continuous function of a scheduling parameter. The scheduling parameter is a proportion of the resource allocated, e.g., we assume proportional scheduling (PS), without mandating a particular implementation. The model itself could be constructed online, and iteratively improved as the system is running.

Contributions of the present disclosure include: 1) A framework for unifying diverse real-time requirements, using utility functions and different latency percentiles, into an objective for the system to achieve. 2) A distributed method that continually optimizes the system, by adjusting scheduling parameters, and which takes into account feedback of workload, resource and model changes. Under certain constraints, the method is guaranteed to converge to the optimal solution. 3) An experimental evaluation has been performed, using both simulation and prototype implementations that demonstrate fast convergence, scalability, and the ability to improve the latency models at runtime.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

We consider distributed real-time applications that can be modeled using a typical task, subtask model, with the generalization that multiple jobs in a subtask can be released without waiting for previous jobs to finish. This captures real-life workloads with bursty arrivals. The model will now be explained in more detail.

Referring now to the drawings in which like numerals represent the same or similar elements and initially to FIG. 1, a diagram shows an illustrative portion of a system 10, which implements the present principles. System 10 includes nodes 14, which perform jobs 16. Each node 14 and link 15 provide a set of resources for which applications compete in order to meet timeliness constraints. For example, nodes 14 provide CPU, whereas links 15 provide network bandwidth. The nodes 14 and links 15 in the system form paths 18. Jobs may be localized computations performed on/at nodes 14 or links 15, such as job 16. Each job belongs to a subtask, and subtasks together form a task. The dependencies between subtasks (and jobs) in a task are represented by a subtask graph. A path 18 in the subtask graph can cross one or more nodes and links. A task has a task controller 12. Nodes 14 may include computer processing unit (CPU) resources, which may be shared between paths or tasks on or through that node. Links 15 in the system 10 represent bandwidth resources. Nodes 14 or links 15 individually compute resource price and send the price information to task controllers 12 if they have jobs running on them associated with the task controllers 12. Controllers 12 run on/at nodes with resources as well.

System 10 includes task controllers 12 and nodes 14 and links 15 that send resource prices which control the system in accordance with the present principles. Each controller 12 is configured to compute path price for each path in its task and determine new deadlines for all jobs/subtasks in their task based upon latency determinations using path and resource prices. The deadlines are sent to the resources to provide updates to the deadline to optimize system performance. The methodology is iterative so that the system is constantly checking itself to ensure the best performance in terms of latency assignment.

The system 10 may be employed as scheduling a program, assembly line processing, stream based processing or any other system that includes shared resources and their allocation.

Figure 2:
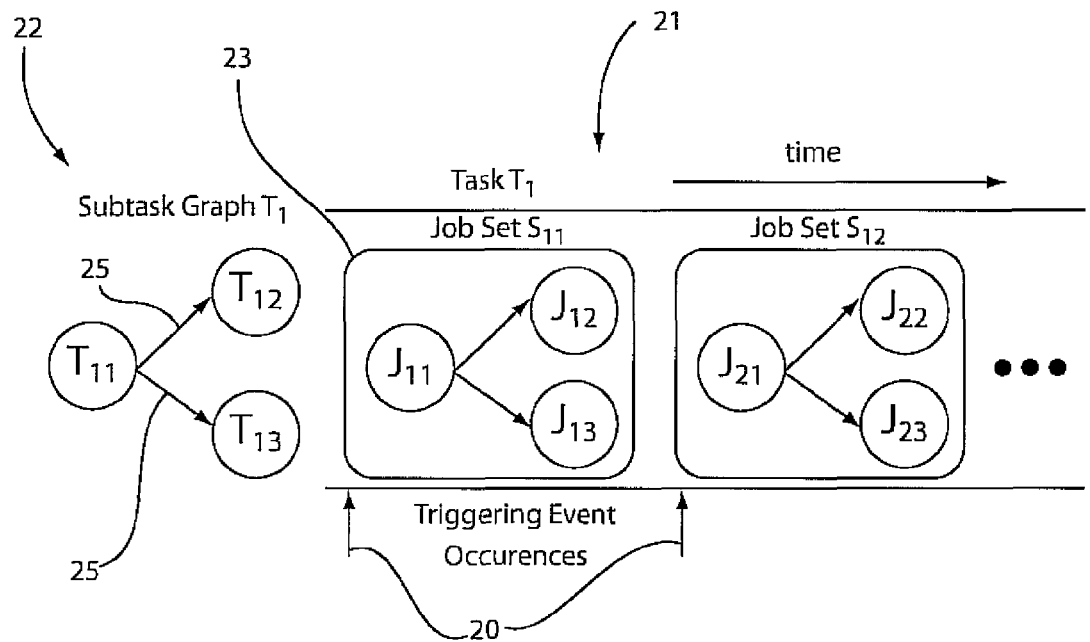
FIG. 2 is a subtask graph and timeline diagram showing a task with job sets triggered by triggering events in accordance with the present principles.

Referring to FIG. 2, a task $T_1$ includes subtasks $T_{xy}$ (e.g., $T_{11}, T_{12}, T_{13}$) presented in a subtask graph 22. A timeline 21 for task $T_1$ shows a set of triggering events 20. When a triggering event 20 occurs, a first job set 23, i.e., job set $S_{11}$ becomes eligible for release. The job sets S and jobs j resulting from two releases of the same task are shown in the timeline 21. The corresponding jobs in both job sets belong to the same subtask, and the precedence relationship between jobs in a job set corresponds to the precedence relationship between subtasks in a task, and is referred to as the subtask graph. For clarity, we have shown job set executions which are non-overlapping in time, though there is no such restriction in the model. The context is a distributed system composed of nodes interconnected by links. Each node and link provides a set of resources for which applications compete in order to meet timeliness constraints (see e.g., FIG. 1). For example, nodes provide CPU, whereas links provide network bandwidth. Applications are defined similarly to an end-to-end task model in which there are a set of tasks, $T=\{T_i\}$, each of which includes a set of subtasks, $S_i=\{T_{ij}\}$. Subtasks may execute on different resources with the restriction that each subtask consumes exactly one resource. The restriction that a subtask consumes exactly one resource is only for simplicity of exposition, and should not be construed as limiting the present invention.

Subtasks may also specify properties which describe how a resource will be utilized, for example, worst case execution time (WCET). Note that an application including computation and communication will be modeled uniformly in terms of subtasks: the computation is modeled as subtasks which consume processor resources; and the communication is modeled as subtasks which consume network resources.

Tasks are dispatched/released in response to triggering events 20 which are signals with an arrival pattern and optional data. For example, a triggering event 20 may be a periodic signal at a constant rate. The arrival patterns of triggering events 20 are included in task specifications, or measured at runtime, for scheduling purposes.

The release of subtasks S is constrained by a precedence relation called a subtask graph 22, which is a directed acyclic graph of subtasks with a unique root. The root is called the start subtask (e.g., $T_{11}$), and the leaf nodes are called end subtasks (e.g., $T_{12}, T_{13}$). Edges 25 in the graph represent precedence, either in the form of data transmission or logical ordering constraints. Formally, the subtask graph (22), $G_i$ for task $T_i$ is denoted by the relation $G_i \subseteq S_i \times S_i$ where $G_i$ is acyclic. A path p in $G_i$ is defined to be a sequence of subtasks $T_{ia}$, $T_{ib}, \ldots, T_{in}$ where: each adjacent pair $T_{ix}, T_{iy}$ satisfies ($T_{ix}$, $T_{iy}$) Å $G_i$; $T_{ia}$ is the unique root of $G_i$; and $T_{in}$ is a leaf node of $G_i$.

We denote by $P_i$ all paths in the subtask graph of a task i. We use the term job to distinguish separate instances of a released subtask. As mentioned earlier, jobs of a subtask can be released concurrently or overlap. Regardless of overlap, precedence constraints across subtasks are still observed. The set of jobs which correspond to a particular task release are called a job set and represent an instance of the subtask graph 22. Formally, a job set $J_{ij}$ represents the $j^{th}$ instance of task $T_i$ and includes a set of jobs $J_{ij}=\{j_{jk}: T_{ik} Å S_i\}$. Task execution is subject to timeliness constraints which are described below.

Timeliness Constraints:

The timeliness constraint for a task constrains the total latency incurred by a job set dispatched for the task. The latency for a job set is defined as the interval between a dispatch time of the job corresponding to the root subtask and the completion time of all jobs corresponding to end subtasks. We specify this timeliness constraint using a utility function which is a non-increasing function that maps job set latency to a utility value. The maximum allowable latency may be limited by a critical time beyond which latency may not extend regardless of utility. Thus, critical time is analogous to a deadline.

Figure 3:
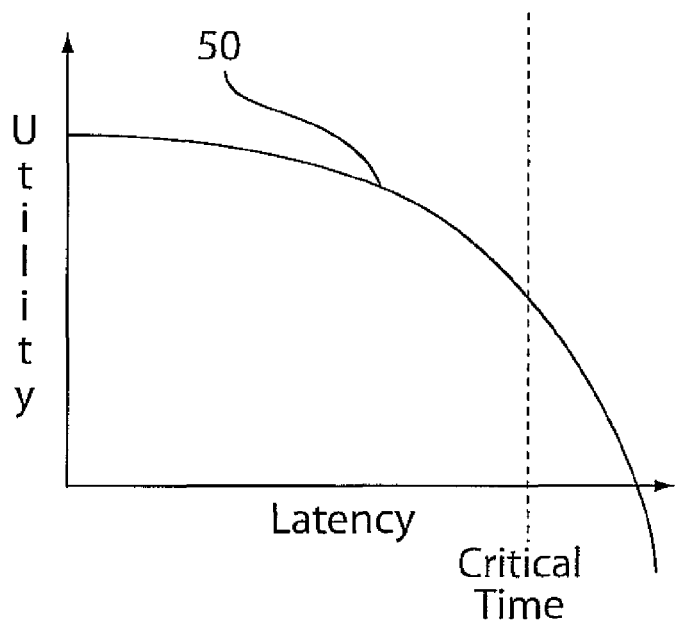
FIG. 3 is a plot showing an illustrative utility function as a function of time (latency)

Referring to FIG. 3, a sample utility function 50 is illustratively depicted. Utility functions are a generalization of simple deadlines where, in addition to defining absolute constraints (e.g., latency should not exceed the critical time), the shape of the function can be used to derive tradeoffs between latency (e.g., resource allocation) and benefit to the application. Thus, one goal is to satisfy all application deadlines (i.e., critical times) while maximizing utility.

The latency (and hence utility) of a job set depends on the latency experienced by the individual jobs within the set. The latency experienced by an individual job depends on resource allocation and may vary according to application parameters. Task specifications are expected to define properties which help to determine the latency for jobs. For example, worst case or average case execution time. Specifications could be derived or corrected from runtime measurements. We can combine these specifications (including trigger event specifications) together with a model of resources to derive the predicted latency for a job.

When job latency is worst case, we can formalize utility computations as follows (cases other than worst case are considered hereinbelow). Let $T_i$ be a task with subtasks $S_i$ and subtask graph $G_i$. For a subtask $s \in S_i$, let $lat_s$ be the worst case latency for any release of s given current resource allocations.

The (worst case) latency of a path, $p \in P_i$ is the sum of the latencies of each subtask in the path: $\Sigma_{s \in p} lat_s$. We define a critical path as the path with the maximum latency among all possible paths in a subtask graph. Thus, the (worst case) latency of a job set is the latency of the critical path. Therefore, the utility for a task $T_i$ is given by the function:

$$U_i = f_i \left( \max_{p \in P_i} \sum_{s \in p} lat_s \right) \quad (1)$$

where an example of $f_i$ is the function shown in FIG. 3. That is, utility is computed from the worst possible latency experienced for the task. The case where "lat" is other than worst case is more complicated. Let $lat^p_s$; be the latency bound for the $p^{th}$ percentile of jobs released for subtask s. For example, $lat_s^{0.5}(t)$ gives the median latency for jobs released for s. Note that for two subtasks a and b, the sum $lat_a^p + lat_b^p$ yields the $p^2$ latency percentile. Thus, in the case where all paths have the same length n, we must use the $p^{1/n}$ latency percentile for each subtask to compute utility as a function of the $p^{th}$ latency percentile.

If path lengths are not identical, then separate latency functions are employed depending on the path being computed. The model can be used with any latency percentile, but to simplify the exposition we will omit the percentile subscript and assume that the percentiles have been appropriately chosen for each subtask latency function. Also, for simplicity of exposition, we assume that no two subtasks in the same task consume the same resource.

Optimization Problem:

One goal is to find the latencies for each subtask in the system such that we achieve optimal value for the sum of utilities across all tasks. We express this goal as a constrained optimization problem.

Optimization:

Let R be the set of all resources. Every resource is characterized by a share function to map subtasks to resource shares and an availability value. The resource availability ($B_r$, where $B_r \in [0,1]$) represents the fraction of the resource available to the competing tasks. We define the share function later. Each subtask is part of exactly one task and will execute at exactly one resource. For simplicity, we abuse notation and denote all subtasks associated with either a particular task or resource by $S_i$ where i represents the task or the resource, depending on the context. Furthermore, unless we explicitly need to distinguish among separate instances of the same subtask or task, we use interchangeably the terms job and subtask, respectively, job set and task. For every task i, $C_i$ is the critical time (i.e., deadline) of the task. Every subtask s has a predicted latency (lat(s)). The latency is determined by the resource where the job runs using both job properties (e.g., worst case execution time) and resource properties (e.g. lag in scheduling, share assignment).

One objective is to maximize the total utility of the system, defined as the sum of utilities across all tasks:

$$\max \sum_{i \in T} U_i \quad (2)$$

There are two different constraints:

1) Resource Constraint:

Each subtask competing for a resource receives a share of the resource for execution. To model the correspondence between a subtask, its latency and its share, we define, for each resource r, the function $share_r: S_r \times R^+ \to [0, 1]$. The resource constraint states that all jobs running at a resource must be schedulable, therefore the sum of resource shares allocated to each of them are lower than the fraction of available resources:

$$\sum_{s \in S_r} share_r(s, lat_s) \leq B_r, \forall r \in R \quad (3)$$

2) Critical Time Constraint:

To ensure that a task instance finishes in time, its end-to-end latency for each path in the subtask graph should be smaller than its critical time.

$$\sum_{s \in p} lat(s) \leq C_i, \forall i \in T, p \in P_i \quad (4)$$

Utility Functions:

The utility of a task represents the benefit derived from the completion of the task. Utilities are non-increasing functions that map end-to-end task latencies to a benefit value: the earlier a task completes the more benefit it produces. Two categories of utility functions will illustratively be identified, for elastic tasks and inelastic tasks. For an elastic task, benefit increases as latency decreases. Such tasks are typical of soft real-time systems and allow trade-offs between overall system benefit and utilization of resources. An inelastic task is representative of traditional hard real-time tasks where the only important behavior is that tasks complete before their deadline. Inelastic tasks constrain resources, but do not allow trade-offs between benefit and utilization. Our approach can accommodate both elastic and inelastic tasks.

Figure 4:
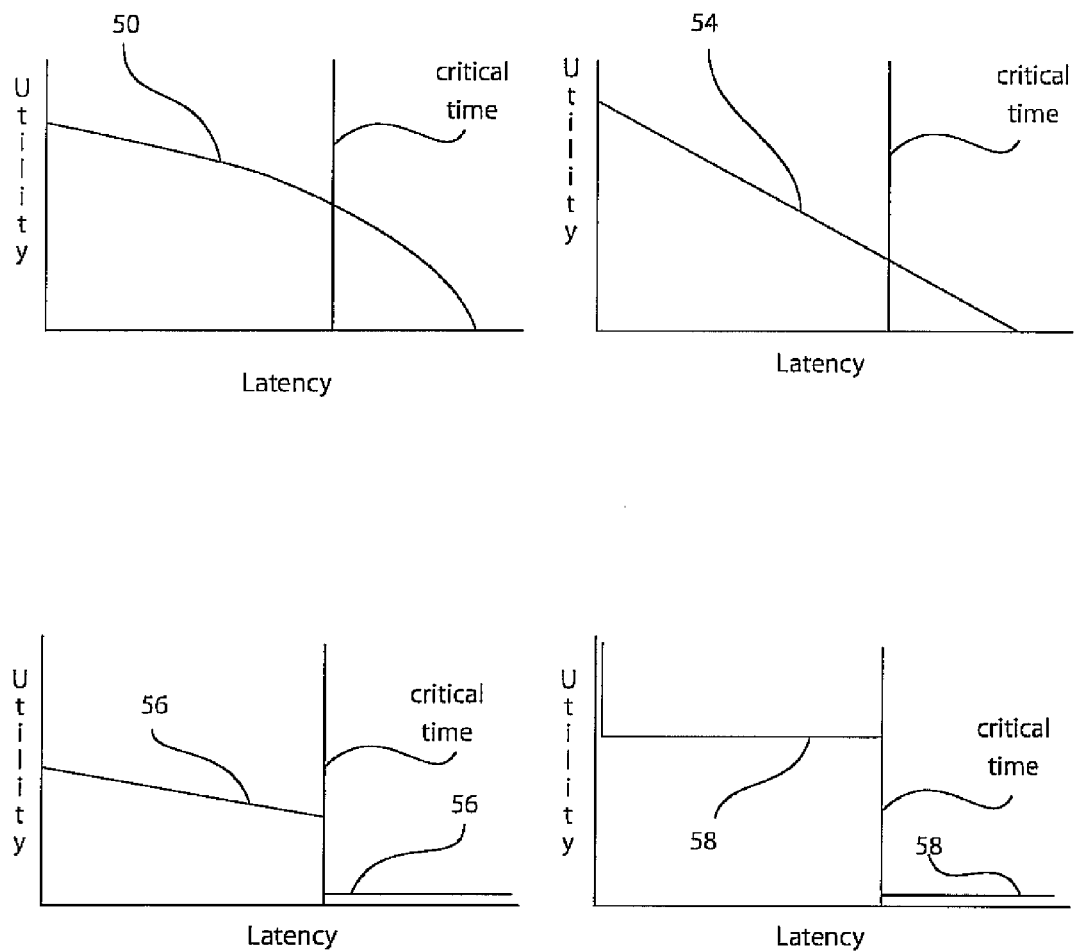
FIG. 4 shows a plurality of different utility functions including continuous logarithmic, continuous linear, step decreasing and step constant utility functions.

Referring to FIG. 4, examples for both elastic and inelastic utilities are illustratively shown. Equation 1 defines the task utility in terms of the critical path in the subtask graph. However, since the method continuously adjusts the scheduling parameters to reflect the best possible allocation, the critical path may change. This potentially makes the objective function of the optimization non-concave and prevents the method from finding a single optimal allocation. To make the problem tractable, we propose two variations of the utility function of a task $T_i$: 1) Sum: The utility of $T_i$ is defined in terms of the sum of the latencies of each subtask belonging to $T_i$. 2) Path-weighted: The utility of $T_i$ depends on the weighted sum of the latencies of each subtask belonging to $T_i$. The weight of each subtask s is proportional to the number of paths that s belongs to.

Proportional Share scheduling:

We employ a proportional share (PS) mechanism to map jobs to share requirements. In proportional share scheduling, every job receives a fraction of the resource on which it executed. We chose proportional shares as our scheduling mechanism because shares provide an easy way to partition CPU and link resources. Proportional shares offer stronger guarantees to applications and enable performance isolation between subtasks. It is important to prevent poorly behaved subtasks from consuming more than their allotment of share. Furthermore, during underload conditions, when jobs finish execution faster than expected, PS schedulers allocate the excess resource time fairly among the other competing jobs. Other mechanisms, like traditional priority or time-sharing schedulers, are simpler than proportional share, but do not offer a straightforward way for partitioning resources to enable performance isolation.

Admission Control:

Admission control could be used at the granularity of tasks, or for job sets in a task. We assume any admission control is layered on top of our approach, and is outside the scope of this disclosure.

Distributed Optimization:

We describe Lagrangian Latency Assignment or LLA. LLA is a distributed method that assigns latencies to all jobs in the system such that the total system utility is optimal.

We say that a system is congested whenever at least one of the constraints defined by Equations 4 and 3 is violated. We identify two types of congestion, depending on the type of constraint that is not respected. Resource congestion occurs when a resource cannot schedule all subtasks executing locally (i.e., the sum of their shares is greater than $B_r$) and path congestion occurs when a path in the subtask graph cannot finish execution before its critical time.

At any moment, we can make the utility of a task higher by decreasing the latency of any of the subtasks on the critical path of the task. This may potentially create congestion in the system, both in a direct and an indirect way. First, decreasing the latency of a subtask makes the share allocated to the subtask bigger, which can lead to resource congestion. The only way to control the resource congestion is to give a smaller share to at least one of the other subtasks executed on the resource. However, decreasing the share of a subtask makes the individual latency of the subtask bigger and, if the subtask is on a critical path, can delay the associated task beyond its critical time. Thus, decreasing the latency can also create path congestion in the system. To guarantee that no congestion occurs, a task controller would have to be coordinated with all the other task controllers, which is impractical in real systems. We use the concept of "price" to solve the problem in a distributed setting.

A price is associated with each resource and each path and indicates the level of congestion in the resource or the path. Each resource computes a price value and sends it to the controllers of the tasks that have subtasks executing at the resource. Each controller computes prices for all paths in the associated tasks. Based on the received resource prices and the local path prices, a controller can calculate new deadlines for the subtasks in its task.

LLA solves the optimization problem iteratively. A single iteration includes latency allocation and price computation. Latency allocation predicts the optimal latencies at a certain time, given fixed resource and path prices. Price computation computes new values for the prices, given constant latencies for all subtasks in the system. The method can iterate indefinitely or until convergence, but the allocations may be only enacted periodically or when significant changes occur.

Latency Allocation:

The latency allocation method runs at each task controller. The latency allocation method computes new latencies for all subtasks in the task, based on feedback from the resources where these subtasks run and from the paths to which they belong, and uses the Lagrangian of the original optimization problem (Equations 2, 3 and 4):

$$L(lat_s, \mu_r, \lambda_p) = \sum_{i \in T} U_i - \sum_{r \in R} \mu_r \left( \sum_{s \in S_r} share_r(s, lat_s) - B_r \right) - \sum_{i \in T, p \in P_i} \lambda_p \left( \sum_{s \in p} lat_s - C_i \right) \quad (5)$$

where U is the utility function(s); $\mu_r$ and $\lambda_p$ are the Lagrange multipliers and can be interpreted as the price per unit of resource r and path p, respectively. We will simply refer to $\mu_r$ as resource price and to $\lambda_p$ as path price.

We assume that the utility functions, expressed in terms of subtask latencies, are concave and continuously differentiable, in the region where the critical time constraint is satisfied (equation 4). We also assume that the share functions are strictly convex and continuously differentiable, since increasing latency leads to diminishing returns in terms of decreasing share (and vice versa). This implies that if the utility functions were expressed in terms of share allocation, they would be strictly concave and continuously differentiable. This strict concavity, along with the fact that the resource constraints and critical time constraints are convex sets, means that the maximum for the objective function (e.g., equation 1) is equivalent to finding the maximum for the Lagrangian (dual problem) (equation 5). Lagrangian operation solutions and the dual problem are known in the art.

Thus, instead of solving the original optimization problem, we solve the following alternative problem for each task i, given specific values for $\mu_r$ and $\lambda_p$:

$$D(\mu_r, \lambda_p) = \max_{lat_s} L(lat_s, \mu_r, \lambda_p) \forall s \in S_i, r \in R_i p \in P_i \quad (6)$$

Based on the earlier assumptions, the objective function in Equation 6 is strictly concave and continuously differentiable. The maximum is found by setting its derivative with respect to $lat_s$ to 0:

$$\frac{\partial L}{\partial lat_s} = \frac{\partial U_i}{\partial lat_s} - \sum_{p \in P_i} \lambda_p - \mu_r \frac{\partial share_r(s, lat_s)}{\partial lat_s} \quad (7)$$

where i is the task including subtask s, and r is the resource where subtask s is executed.

Figure 5:
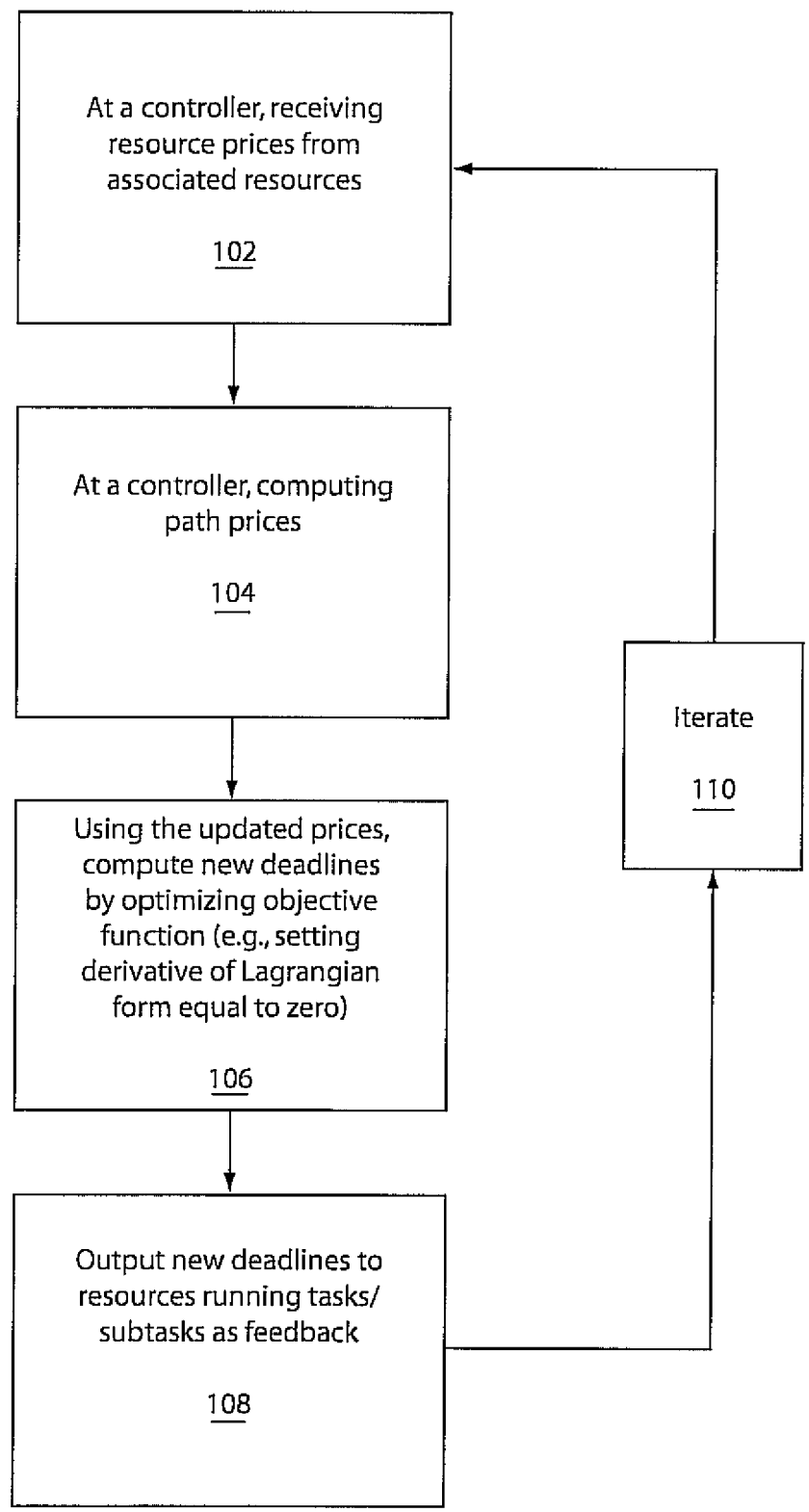
FIG. 5 is a block/flow diagram showing the computing and updating of new deadlines in accordance with one embodiment.

Referring to FIG. 5, a block/flow diagram is illustratively shown for latency allocation by executing the following at a controller of each task. In block 102, receive resource price values $\mu_r$ for tasks or subtasks, e.g., $\forall r \in R_i$. The resource price values are computed by each resource. In block 104, compute path price values $\lambda_p$, $\forall p \in P_i$. In block 106, using the new prices, compute new deadlines ($lat_s$) by setting the derivative with respect to $lat_s$ of the Lagrangian to 0. This optimizes the Lagrangian form of the objective function in terms of share, prices, latency and step size. In block 108, send deadlines ($lat_s$) to the resources where the corresponding tasks/subtasks s are executed. This provides feedback to the resources which can adjust and otherwise improve system performance. In block 110, output latencies ($lat_s$) at each iteration (t=1, 2, . . . ). $\forall i \in T$, $\forall s \in S_i$.

Price Computation:

Prices reflect the congestion of resources and paths. At every iteration, the newly computed latencies may potentially affect the schedulability of jobs on resources or the end-to-end latencies of paths and thus may change the levels of congestion. Consequently, the resource and path prices need to be readjusted. The price computation includes determining new values for the resource and path prices, given the latencies computed in the previous step. Resource prices are computed by each resource locally, while path prices are computed by the controller of the task to which the path belongs.

A price adjustment method is employed based on a gradient projection method: prices are adjusted in a direction opposite to the gradient of the objective function of the dual problem (Equation 6). The component of the gradient corresponding to the prices $\mu_r$, $$\frac{\partial D}{\partial \mu_r}$$

is the available share at resource r. Similarly, $$\frac{\partial D}{\partial \lambda_p}$$

is the available time the end-to-end latency of path p can afford to increase (i.e. slack of the path).

The resulting formulas for adjusting resource and link prices are:

$$\mu_r(t+1) = \mu_r(t) - \gamma_r \left( B_r - \sum_{s \in S_r} share_r(s, lat_s) \right) \quad (8)$$

$$\lambda_p(t+1) = \lambda_p(t) - \gamma_p \left( 1 - \frac{\sum_{s \in S_p} lat_s}{C_i} \right) \quad (9)$$

where r∈R, respectively i∈T, p∈$P_i$ . . . $\gamma_r$ and $\gamma_p$ are step sizes, with $\gamma_r$, $\gamma_p$∈[0,∞). A heuristic to choose the best values for the step sizes is presented hereinafter.

Figure 6:
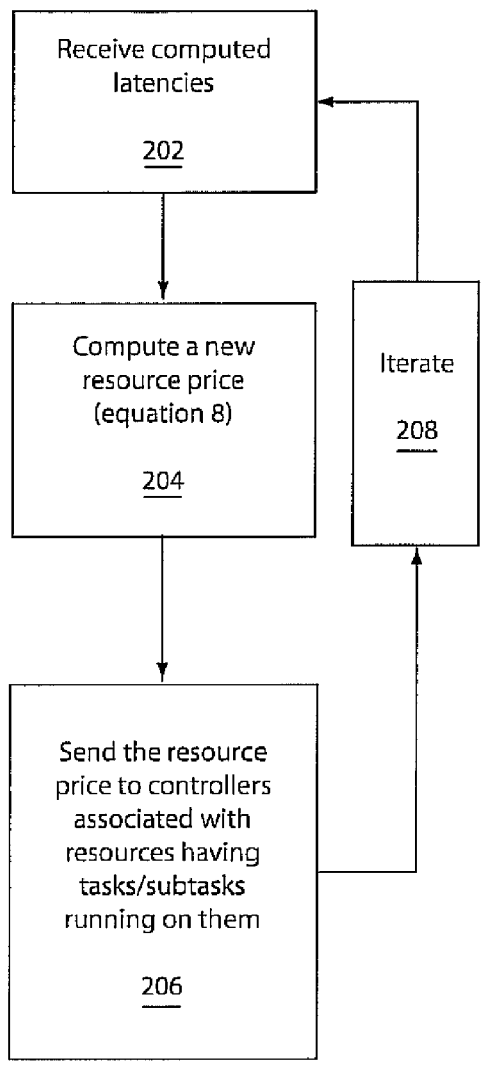
FIG. 6 is a block/flow diagram showing the updating of new resource prices in accordance with one embodiment.

Referring to FIG. 6, a system/method for computing resource price is illustratively shown. The resource price is preferably determined at the resource while the path price is computed by the controller. The path price computation is similar to the resource price computation. In block 202, computed latencies are received (see FIG. 5) of all jobs running at resource r. In block 204, compute a new resource price $\mu_r$ based on Equation 8. In block 206, send the price, $\mu_r$, to the controllers of tasks that have tasks/subtasks running at r. In block 208, output resource price, $\mu_r$, for resource r, at each iteration (t=1, 2, . . . ) and optionally implement a heuristic to adaptively change the value of step sizes for resources.

Figure 7:
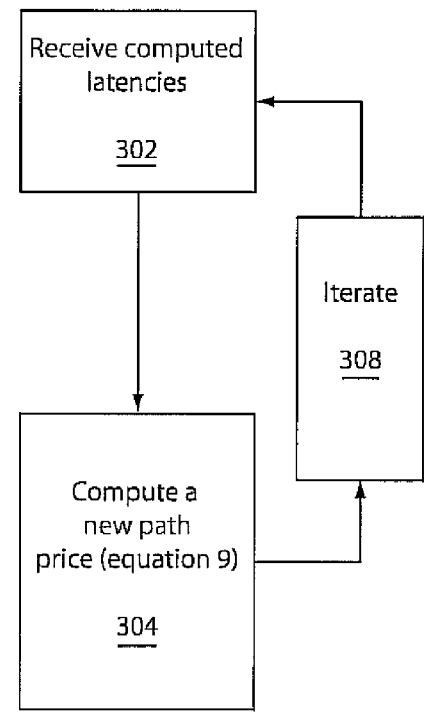
FIG. 7 is a block/flow diagram showing the updating of path prices in accordance with one embodiment.

Referring to FIG. 7, a system/method for computing path price is illustratively shown. The path price is preferably determined at the controller. In block 302, computed latencies are received (from FIG. 5) for all jobs in a program path p. In block 304, compute a new path price $\lambda_p$ based on Equation 9. In block 308, output path price, $\lambda_p$, for path p, at each iteration (t=1, 2, . . . ), and optionally implement a heuristic to adaptively change the value of step sizes for paths.

For the experiments described herein, the latency for subtasks is the worst-case latency. The share function is computed using worst case execution time of jobs in a subtask ($c_s$), latency of the subtask and the resource lag ($l_r$) due to PS scheduling. This is represented as $$share_r(s, lat_s) = \frac{c_s + l_r}{lat_s}. \quad (10)$$

Conversely, we can predict the latency of a job if we know its share of the resource. Since the worst case execution time and the lag are fixed, the share varies only with the latency. Jobs with smaller shares take longer to execute, while jobs with bigger shares will have smaller latencies.

Figure 8:
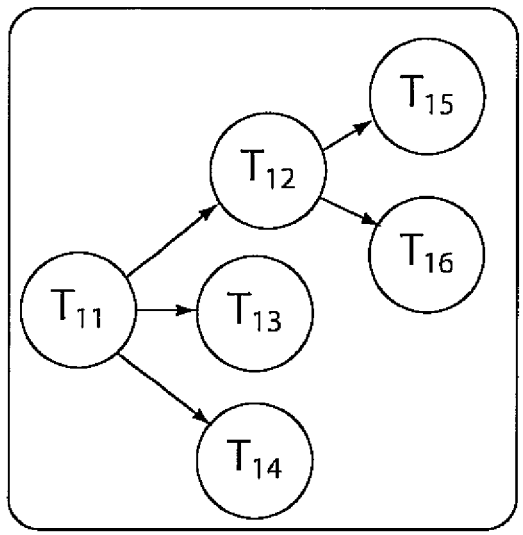
FIG. 8 are diagrams showing three tasks employed in accordance with demonstrating the present principles.
Figure 8:
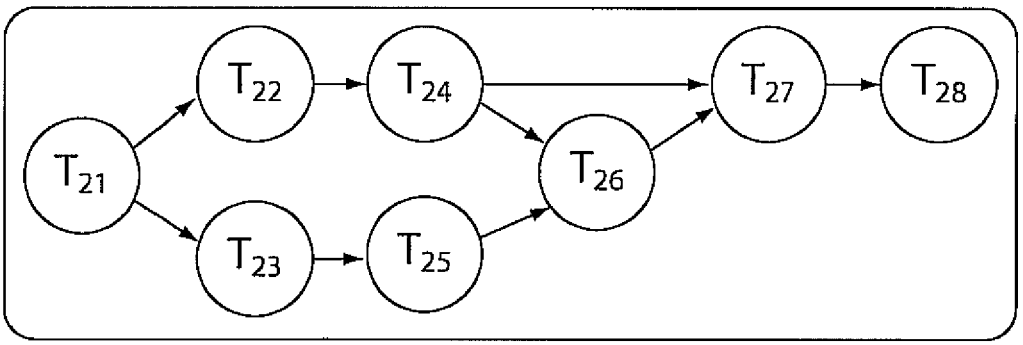
Figure 8:
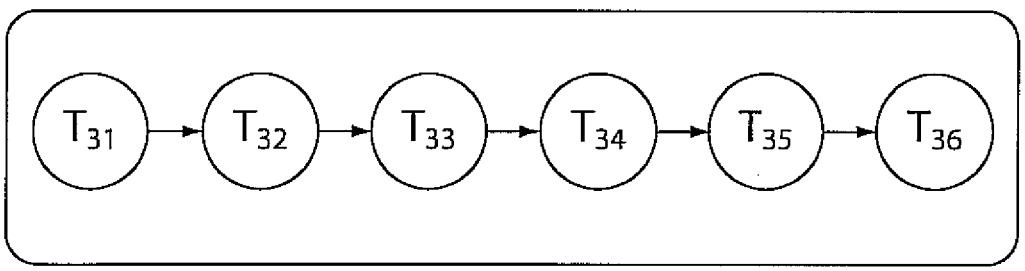

Simulation Experiments:

Workload:

We have constructed several test workloads by specifying a set of tasks and their characteristics. The basic test workload has three tasks, as shown in FIG. 8. Each of the three tasks (Task 1, Task 2 and Task 3) is intended to mirror one type of distributed application with real-time requirements. The first task (Task 1) follows a push-based model similar to the publish/subscribe and multicast paradigms. In such a model, a distributed computation includes a few nodes producing information and propagating it to all other nodes interested in it. The second task (Task 2) represents a complex pull-based model employed by applications such as sensor-based systems or RSS feeds. The distributed computation starts with a node requesting information, aggregating it and sending it to other nodes. Finally, the third task (Task 3) is meant to represent a simpler pull-based model used in client-server applications.

All three tasks are triggered by periodic events occurring every 100 ms. Their end-to-end deadlines (critical times) are respectively 45, 76 and 53 ms. Every task includes several subtasks (T), each running on a different resource. The parametrization of the subtasks is given in Table I which is shown in FIG. 9. We chose the parameters such that the workload is near maximum resource utilization, e.g., the utilization of each resource after the convergence of the method (i.e., the sum of the shares received by each subtask running on the resource) is very close to the available resource. The performance of LLA with workloads that are near maximum resource utilization constitutes a lower bound for its performance with all other schedulable workloads. We experiment with both utility variations: sum and path-weighted.

We test the sensitivity of the present principles by modifying the basic workload in a controlled fashion. First, we check how the method scales by increasing the number of tasks executing concurrently. Then, to record the impact of the task triggering events distribution, we consider bursty arrivals of these events.

Convergence:

First, we focus on the convergence properties of the method. We use the path-weighted approximation for the utility function:

$$U_i = f_i\left(\sum_{s \in S_i} w_s \times lat_s\right) \quad (11)$$

The weight $w_s$, of a subtask is equal to the number of paths in the task that the subtask belongs to. To map latency to benefit, we use a simple linear continuous function: $f_i(lat) = k^*C_i - lat$, where $k \geq 1$. In the experiments, we chose $k=2$. Other values of k and other shapes of the utility yield similar results. We run the simulation four times, each time stopping it after 500 iterations. An iteration includes a latency allocation run by each task controller and a resource allocation run at each resource. We measure the global value of the utility after each step.

Figure 10:
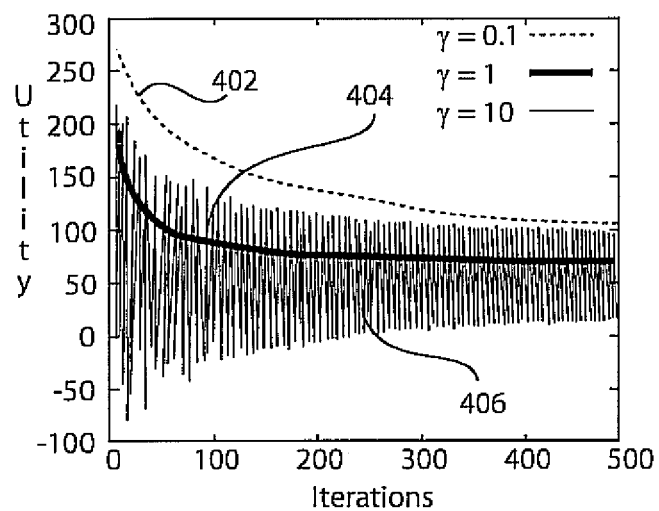
FIG. 10 is a plot showing the effect of applying fixed step sizes for updating prices.

Since we want a fair trade-off between resource allocation and latency, we assume that the resource and path step sizes ($\gamma_r$, and $\gamma_p$) are equal to each other and denote them simply by $\gamma$. At first, we assign fixed values to the step size, Later, we develop a heuristic in which we adaptively change the value of $\gamma$. FIG. 10 depicts the system utility for three different values of the step size: 0.1, 1, and 10. Plots 402, 404 and 406 respectively depict the step sizes of 0.1, 1, and 10.

When the step size is high ($\gamma=10$), the value of the utility oscillates with high amplitude around 50. If we decrease the step size ($\gamma<10$), the utility converges. The number of iterations needed to achieve convergence depends on the value of $\gamma$. When $\gamma=0.1$, the stabilization occurs after more than 1000 iterations (not shown), while for $\gamma=1$, convergence is achieved after around 500 iterations. Thus, larger values of the step size lead to faster convergence, but they also make the oscillations larger. To turn this trade-off to our advantage, we can start with large step size values to ensure fast convergence. Then, decrease $\gamma$ to minimize the size of the fluctuations.

We have implemented the following heuristic, based on experimentation to adaptively change the value of the step sizes for resources and paths: 1) start with a fixed value for $\gamma$, 2) at each iteration, if resource r is congested, double the step size associated with r, as well as the step sizes of all paths that traverse r, and 3) as soon as r becomes uncongested, revert the step sizes to the initial values.

Figure 11:
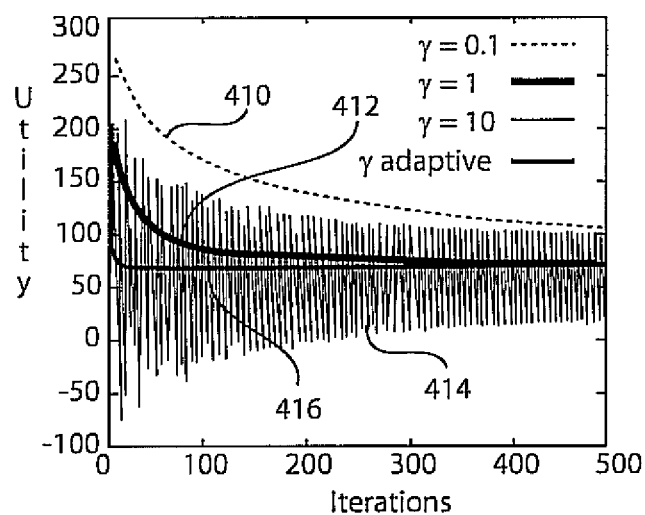
FIG. 11 is a plot showing the effect of applying fixed step sizes for updating prices versus an adaptive step size.

We experimented with different starting values for the step size and we obtained the best results for $\gamma=1$. We compare these results with those for fixed step size in FIG. 11. In FIG. 11, plots 410, 412 and 414 respectively depict the step sizes of 0.1, 1, and 10. Plot 416 shows the convergence due to adaptive step size $\gamma$ control. The utility stabilizes faster and to a better value when the heuristic for adaptive $\gamma$ was used.

We also used the sum approximation for the utility function but the results were not different in terms of convergence properties. From now on, unless specified otherwise, all results will be presented for an adaptive $\gamma$ with path-weighted approximation for the utility and $f_i(lat)=2^*C_i - lat$ as a utility function.

Figure 12:
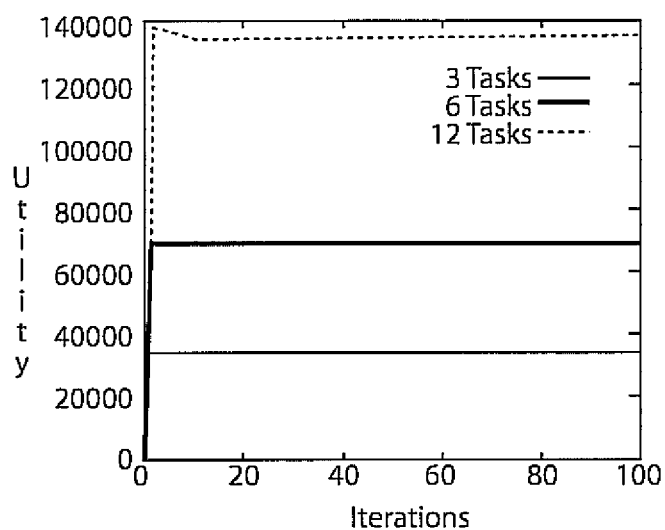
FIG. 12 is a plot to show the effect of convergence as a number of tasks are scaled in accordance with the present principles.

Scalability:

We verify that the present principles maintain convergence properties as we scale the number of tasks that execute simultaneously in the system. We start with the base workload and for each of the tasks we add another task with the same characteristics (subtasks, subtask parameters, subtask graph, subtask-to-resource mapping, critical time). Thus, we obtain a workload with 6 tasks. We repeat the experiment to increase the number of tasks to 12 and we run LLA for the three workloads. However, as we add more and more tasks, more and more subtasks will contend for the same resources and the workload may become unschedulable. We ensure that schedulability is maintained by overprovisioning the system (e.g., we set a high enough critical time for each task). The results, presented in FIG. 12, show that the convergence speed of the method does not depend on the number of tasks executing simultaneously and that the value of the utility increases linearly with the number of tasks.

Figure 13:
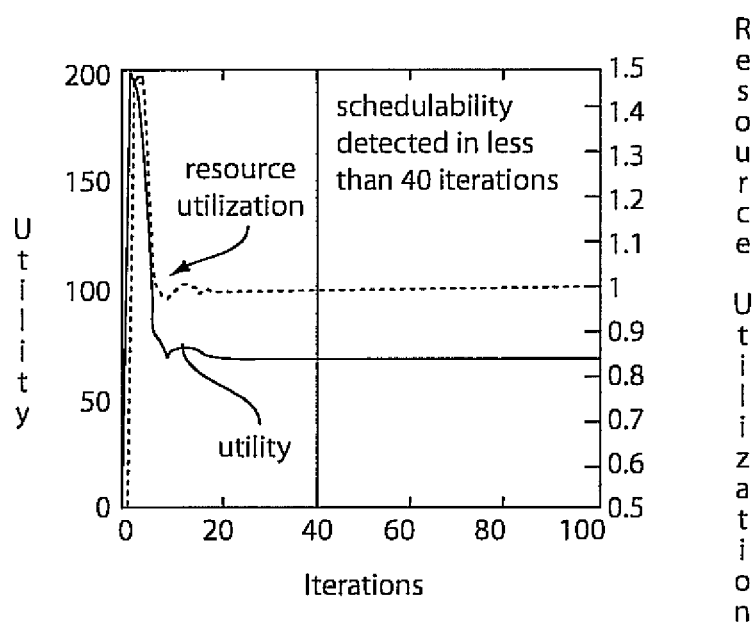
FIG. 13 is a plot to show schedulability of a workload in accordance with the present principles.

Workload Schedulability:

LLA can be used to test the schedulability of a workload when the resources of the system are unknown. The verification is based on the following insight. If a workload is not schedulable, at least one resource will have utilization higher than 1. When that happens, according to Equation 8, the price of that resource increases, determining a variation in the latencies of the subtasks executing on the resource. This leads to both path and resource congestion and ultimately prevents the convergence of the system utility. Thus, if the utility of the system converges, we can safely conclude that the input workload is schedulable. To verify the validity of this statement, we run LLA for 200 iterations on the base workload and measure the global utility and the utilization of every resource after each iteration. FIG. 13 shows the results. The utilization of each resource stabilizes at a value not higher than 1. Therefore, the workload is schedulable. Note that in this case the utilization of each resource becomes exactly 1 because of the way we chose the parameters of the base workload. If a workload is schedulable, the verification lasts only as long as it takes for the utility to converge. In the above example, the utility converges after less than 40 iterations, where an iteration takes roughly at most as much as the maximum round trip time between any nodes in the system. If a workload is not schedulable, the verification lasts until we stop the processing.

The latency of a subtask in the present framework can be interpreted as a soft deadline: to achieve optimal resource allocation each subtask instance should not execute for longer than its expected latency. The present methods produce an optimal latency assignment through online optimization. The objective function is not a measure of schedulability. Instead, it mirrors different importance and latency requirements and is defined in terms of the local latencies. We use prices to estimate and enforce schedulability and to guarantee end-to-end deadlines.

LLA continuously adjusts the expected latencies based on input from the system. However, present embodiments are optimization-based and use a resource-latency model to provide feedback for latency adjustment.

Having described preferred embodiments of a system and method for distributed online optimization for latency assignment and slicing (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for latency assignment in a system having shared resources for performing jobs, comprising:
   computing a new resource price at each resource based on latencies in a previous iteration;
   sending the new resource price to a task controller that has at least one subtask running at the resource, wherein each subtask has an initial deadline;
   determining new deadlines for the subtasks in a task based on the new resource prices at the task controller, comprising determining an optimal deadline by maximizing an objective function based on utility functions for each task, wherein the utility functions are based on a percentile of a task latency; and
   sending the new deadlines to the resources where at least one subtask in the task is running to improve system performance.

2. The method as recited in claim 1, wherein computing a new resource price includes computing the new resource price using a gradient projection method.

3. The method as recited in claim 1, wherein computing a new resource price includes computing the new resource price in accordance with $$\mu_r(t+1) = \mu_r(t) - \gamma_r \left( B_r - \sum_{s \in S_r} \text{share}_r(s, lat_s) \right),$$

where $\mu_r(t)$ is the price for resource r at a given iteration t, $\gamma_r$ is a step size, $B_r$ is a resource availability, $S_r$ is a set of subtasks, $\text{share}_r$ is a share function, and $lat_s$ is the worst case latency for a subtask s.

4. The method as recited in claim 3, wherein computing the new resource price includes adjusting a step size in accordance with resource congestion.

5. The method as recited in claim 1, further comprising computing a path price for each task path of the task controller if there is a critical time specified for the task.

6. The method as recited in claim 5, wherein computing a path price for each task path includes computing the path price based upon latencies in a previous iteration.

7. The method as recited in claim 5, wherein computing a path price for each task path includes computing the path price in accordance with $$\lambda_p(t+1) = \lambda_p(t) - \gamma_p \left( 1 - \frac{\sum_{s \in S_p} lat_s}{C_i} \right),$$

where $\lambda_p(t)$ is the price for path p at a given iteration t, $\gamma_p$ is a step size, $S_p$ is a set of subtasks, $lat_s$ is the worst case latency for a subtask s, and $C_i$ is a critical time of a task i.

8. The method as recited in claim 7, wherein computing the path price includes adjusting a step size in accordance with resource congestion.

9. The method as recited in claim 1, wherein determining new deadlines includes computing a share of a resource to allocate to a subtask.

10. A non-transitory computer readable storage medium comprising a computer readable program for latency assignment in a system having shared resources for performing jobs, wherein the computer readable program when executed on a computer causes the computer to perform the steps of:

computing a new resource price at each resource based on latencies in a previous iteration;

sending the new resource price to a task controller that has at least one subtask running at the resource, wherein each subtask has an initial deadline;

determining new deadlines for the subtasks in a task based on the new resource prices at the task controller, comprising determining an optimal deadline by maximizing an objective function based on utility functions for each task, wherein the utility functions are based on a percentile of a task latency; and sending the new deadlines to the resources where at least one subtask in the task is running to improve system performance.

11. The computer readable storage medium as recited in claim 10, wherein computing a new resource price includes computing the new resource price using a gradient projection method.

12. The computer readable storage medium as recited in claim 10, further comprising computing a path price for each task path of the task controller if there is a critical time specified for the task.

13. The computer readable storage medium as recited in claim 12, wherein computing a path price for each task path includes computing the path price based upon latencies in a previous iteration.

14. The computer readable storage medium as recited in claim 10, wherein determining new deadlines includes computing a share of a resource to allocate to a subtask.

15. A computer implemented method for latency assignment in a system having shared resources for performing jobs, comprising:

computing a new resource price at each resource based upon latencies in a previous iteration;

sending the new resource price to a task controller that has at least one subtask running at the resource as feedback, wherein each subtask has an initial deadline;

computing a path price for each path of the task at the task controller based upon latencies in the previous iteration;

determining new deadlines for the subtasks in a task based on the resource prices and the path prices at the task controller by maximizing a Lagrangian of a constrained objective function describing subtask latencies, wherein the objective function is based on utility functions for each task and the utility functions are based on a percentile of a task latency;

sending the new deadlines to the resources where at least one subtask is running; and iterating to update deadlines.

* * * * *